No. 767,841. PATENTED AUG. 16, 1904.
C. SKIDMORE.
WAGON SCALE.
APPLICATION FILED AUG. 15, 1903. RENEWED JULY 11, 1904.
NO MODEL. 4 SHEETS—SHEET 1.
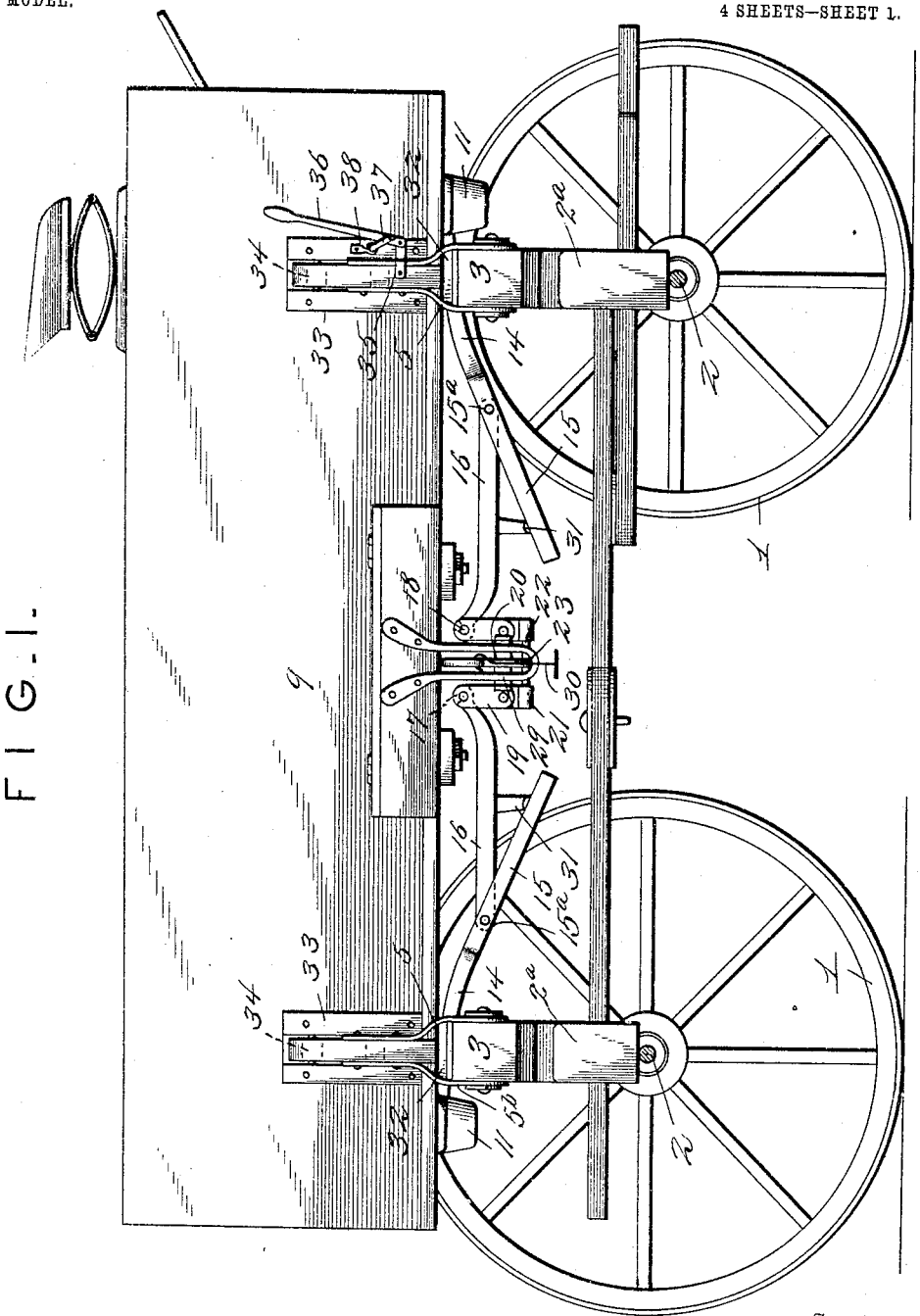
FIG. I.
Witnesses
Harry L. Amer.
Hubert D. Lawson.
Inventor
Charles Skidmore.
By Victor J. Evans
Attorney

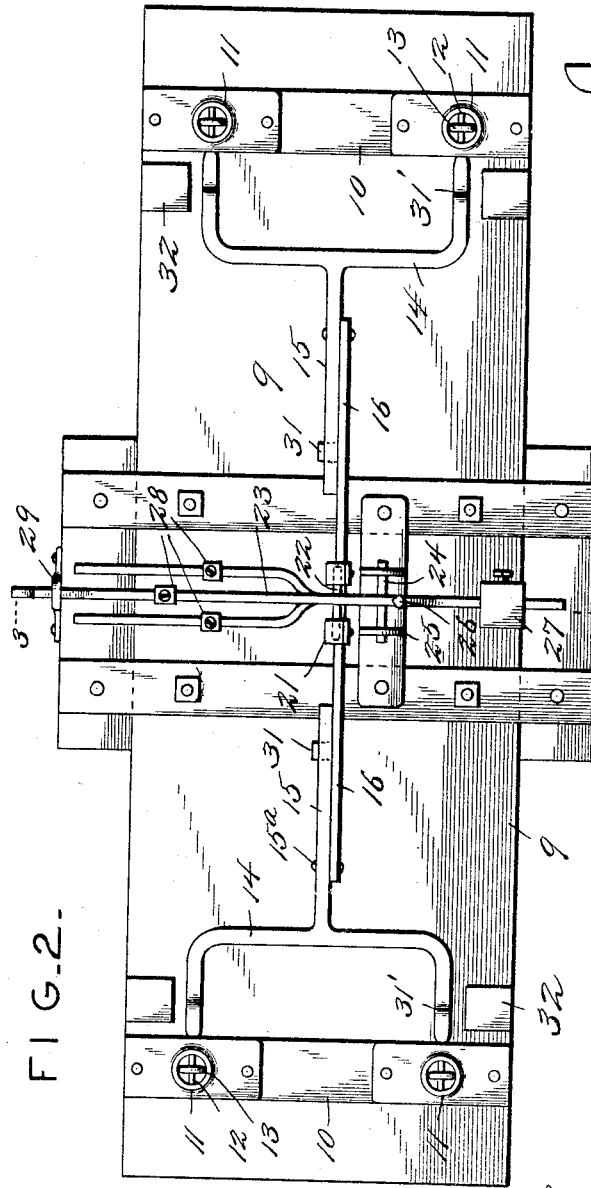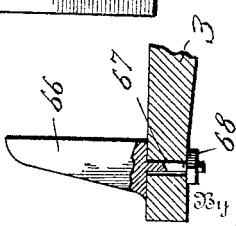

No. 767,841. PATENTED AUG. 16, 1904.
C. SKIDMORE.
WAGON SCALE.
APPLICATION FILED AUG. 15, 1903. RENEWED JULY 11, 1904.
NO MODEL. 4 SHEETS—SHEET 3.
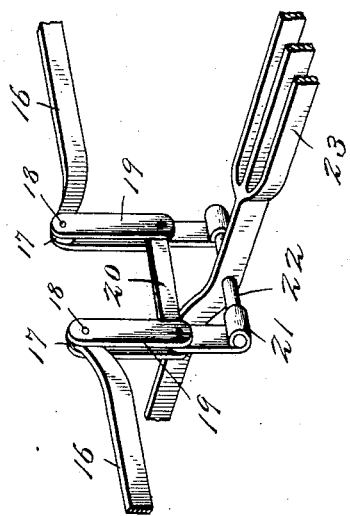
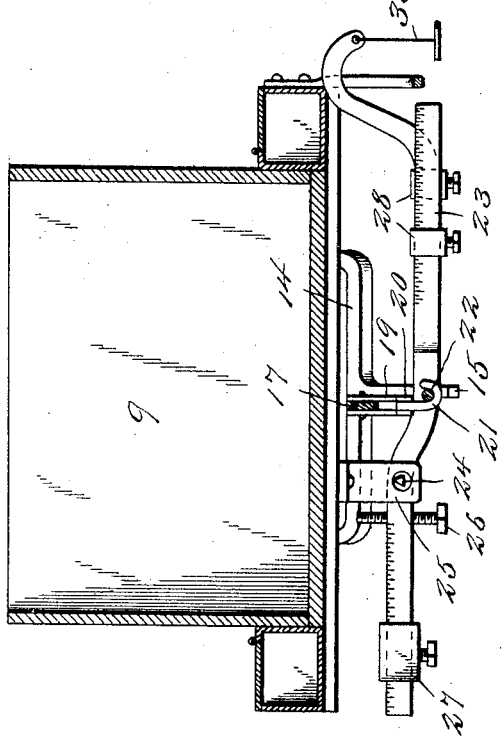
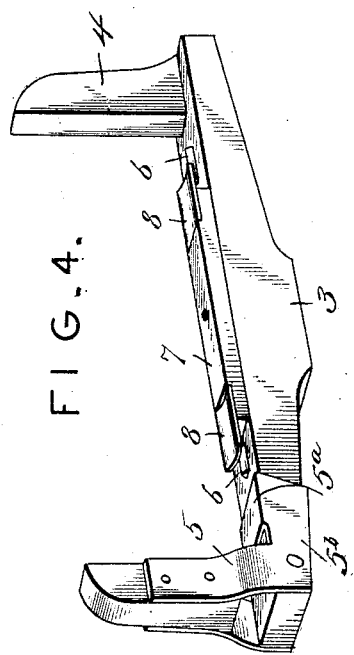
Witnesses
Harry L. Ames.
Hubert D Lawson.
Inventor
Charles Skidmore.
By Victor J. Evans
Attorney No. 767,841. PATENTED AUG. 16, 1904.
C. SKIDMORE.
WAGON SCALE.
APPLICATION FILED AUG. 15, 1903. RENEWED JULY 11, 1904.
NO MODEL. 4 SHEETS—SHEET 4.
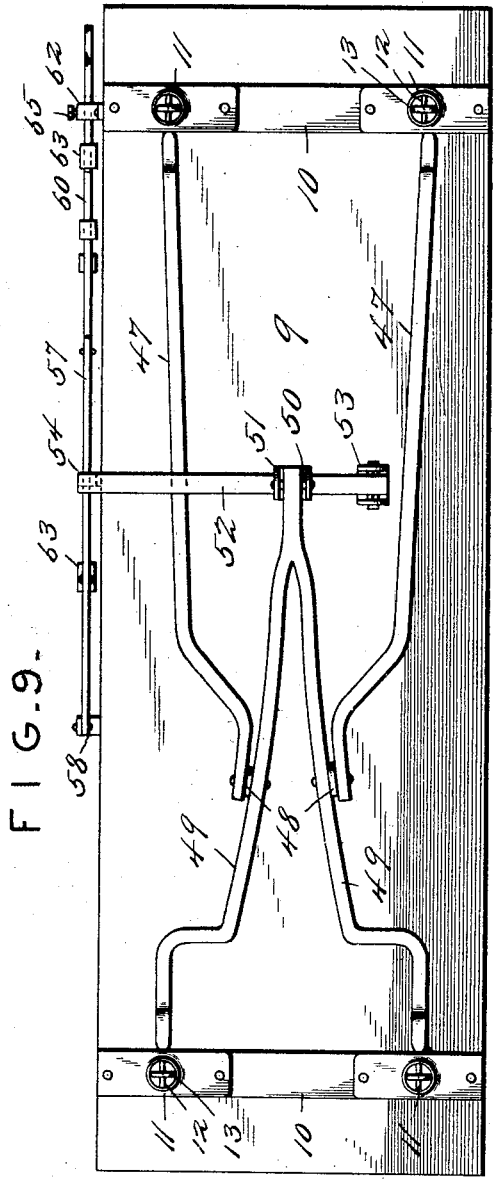
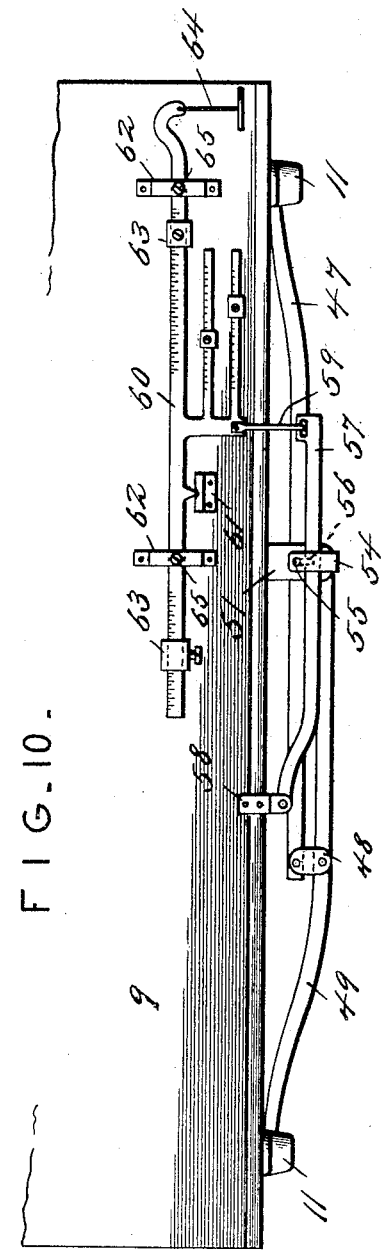
Witnesses
Harry L. Amer.
Herbert D. Lawson.
Inventor
Charles Skidmore,
By Victor J. Evans,
Attorney No. 767,841.

Patented August 16, 1904.

UNITED STATES PATENT OFFICE.

CHARLES SKIDMORE, OF HOMER, NEBRASKA.

WAGON-SCALE.

SPECIFICATION forming part of Letters Patent No. 767,841, dated August 16, 1904.

Application filed August 15, 1903. Renewed July 11, 1904. Serial No. 216,174. (No model.)

*To all whom it may concern:*

Be it known that I, CHARLES SKIDMORE, a citizen of the United States, residing at Homer, in the county of Dakota and State of Nebraska, have invented new and useful Improvements in Wagon-Scales, of which the following is a specification.

My invention relates to new and useful improvements in wagon-scales, and it is more especially an improvement upon the device described and claimed in Patent No. 732,228, granted to me June 30, 1903. Its object is to provide scale mechanism of simple and inexpensive construction which is located under the body of the wagon.

A further object is to provide weighing mechanism which can be readily attached to wagon-bodies of different kinds.

Another object is to employ means whereby the weight of the wagon-body and the contents thereof can be quickly removed from the scales when it is not desired to use them.

With the above and other objects in view the invention consists in the novel construction and combination of parts hereinafter more fully described and claimed and illustrated in the accompanying drawings, showing the preferred form of my invention, and in which—

Figure 1 is a side elevation of a wagon having my improved scales connected thereto. Fig. 2 is a bottom plan view thereof with the bolsters and wheels removed. Fig. 3 is a section on line 3 3, Fig. 2. Fig. 4 is a detail view of one of the bolsters adapted to be used in connection with the scales. Fig. 5 is an enlarged section through one of the bearing-plates of the mechanism. Fig. 6 is a section on line 6 6, Fig. 5. Fig. 7 is an enlarged detail view of the mechanism for connecting the pivoted extensions to the scale-beam. Fig. 8 is an elevation of a modified form of scale-beam which may be used in connection with the mechanism. Fig. 9 is a bottom plan view of a modified form of scale mechanism. Fig. 10 is a side elevation thereof, and Figs. 11 and 12 are detail views of modified forms of adjustable standards.

Referring to the figures by numerals of reference, 1 1 are wheels upon the axles 2 of which are arranged axle-beams $2^a$, on which are secured bolsters 3, from the ends of which project standards, which may be rigidly connected thereto, as shown at 4 in Fig. 4, or may be provided with hollow shoes 5. These hollow shoes are preferably formed of heavy sheet metal and are each provided with an inwardly-extending base $5^a$, having flanges $5^b$ for overlapping the sides of the bolster. This base is pivotally connected near its outer end to the bolster and is so arranged that when it is in proper position upon the bolster the standard connected thereto will be held in an upright position. These two forms of standards may be used separately or together, as preferred. By providing the hinged standard the same can be swung laterally after the wagon-body has been raised from the bolster, so as to prevent friction between said body and the standard. Metallic bearing-plates 6 are arranged upon the bolsters near the standards thereon and are preferably V-shaped in cross-section, and secured to these bolsters between the bearing-plates are intermediate strips 7, from the ends of which project retaining-plates 8, which are for the purpose hereinafter more fully described. The wagon-body 9 is mounted at its ends upon transversely-extending plates 10, having depending sockets 11 at their ends, within the lower ends of which are arranged pivot-pins 12. Links 13 are mounted on the pivot-pins and are engaged by the ends of yokes 14, having arms 15 extending inwardly from the centers thereof. To each of these arms is secured at $15^a$ a pivoted extension 16, having hooked inner ends 17, which engage pins 18, formed within links 19, which are pivoted to opposite ends of a cross-bar 20, provided with hooked extensions 21. These extensions engage a pin 22, which extends through a scale-beam 23. A bearing-pin 24 also projects through the beam 23 adjacent the pins 22 and is mounted within a bracket 25, which is secured to the bottom of the wagon-body in any suitable manner. If desired, a set-screw 26 may be arranged within the scale-beam adjacent its bearing-pins and can be used to prevent the operation of the scale-beam when not in use. This set-screw when adjusted inwardly contacts with the bottom of the wagon-body. An adjustable weight 27 is located on the inner end of the scale-beam, and suitable adjustable weights 28 are located at the opposite end of the beam, which may, if desired, be forked, as shown in Fig. 2. One end of the beam is mounted in a depending guide 29, secured to the side of the wagon-body, and to said beam may be fastened a hanger 30 for supporting a desired number of weights. (Not shown.)

The extension 16 has depending arms 31, which engage the arms 15 and hold them at angles to the extensions, as shown in Fig. 1. The yokes 14 have notches 31' therein, into which project the bearing-plates 6, hereinbefore referred to, and these notched portions of the yokes are arranged under the retaining-plates 8 and at opposite ends of the intermediate strips 7 on the bolsters 3. The blocks 32 are formed upon the bottom of the wagon-body at opposite sides of the notched portions of the yokes 14 and are adapted to lie upon the shoes 5 of the standards at the outer ends of the bearing-plates 6. These blocks 32 and the intermediate strips 7 are preferably of the same thickness as the yokes 14. Parallel cleats 33 are arranged upon the sides of the wagon-body adjacent the standards and have rollers 34 journaled therein which form a practically frictionless bearing for the wagon-body when moving between the standards. A bracket 35 is preferably arranged on one of the standards and has a lever 36 pivoted to it. This lever is connected, by means of a lever 37, with a hook 38 upon the wagon-body, and it is obvious that when the lever is pressed downward the wagon-body will be firmly clamped upon the standards and will be prevented from rattling.

When the scales are not in use, the extensions 16 are sprung laterally, so as to disengage the arms 31 from arms 15, and the downward pressure of the wagon-body upon the ends of the yokes will swing the ends of the arms upward until the said wagon-body rests upon the blocks 32 and the intermediate strip 7 on the bolster. The set-screw 26 is also rotated so as to bind upon the base 25 and prevent movement of the scale-beam. When it is desired to use the scales, the lever 36 is swung upward, so as to release the wagon-body from frictional contact with the standards, and the movable stems are then swung outward. Subsequent to this operation the arms 15 are drawn downward and placed in engagement with the arms 31, and the set-screw 26 is rotated so as to release the scale-beam. The device is then ready for use, and any material placed within the wagon-body will be accurately indicated by the movable weights 28 and by any weights which may be placed upon the hanger 30. It will be seen that the downward pressure of the wagon-body on the ends of the yoke will cause the arms 15 and extensions 16 to swing upward, carrying therewith the links 19 and the pins 22 of the scale-beam. As the pins 24 of said beam are stationary, it is obvious that said beam will be swung thereon. By providing links 13 for connecting the yokes with the wagon-body the swinging movement of the yoke during the weighing operation is unhindered.

In Fig. 8 I have shown a modified form of scale-beam, which can either be forked, as shown in Fig. 2, or in a single beam, as shown in said Fig. 8. This beam is formed of two sections which are hinged together, and when not in use the outer section 39 can be swung inwardly upon its hinge 40.

In Figs. 9 and 10 I have shown a modified form of mechanism, the construction of which is such as to bring the adjustable weights and their beams upon one side of the wagon-body in such a position that none of the parts thereof will project laterally from the vehicle. By referring to these figures it will be seen that the yokes employed are substantially similar to those heretofore described, with the exception that one of the yokes, 47, is formed of two separate arms which extend above and are connected by means of links 48 with the other yoke, 49. This last-mentioned yoke projects under a bearing-plate 50, which is mounted in a bracket 51, secured to and depending from a transversely-extending lever 52. This lever is fulcrumed at one end within a bracket 53, secured to the bottom of the vehicle-body 9, and the other end of the lever projects slightly beyond one side of the wagon-body and is provided with parallel upwardly-extending ears 54, having a cross-pin 55 therein, which serves to support a link 56. (Shown in dotted lines in Fig. 10.) This link engages a lever 57 at a point between the ends thereof, said lever being fulcrumed at one end of a bracket 58, connected to one side of the wagon-body. The lever is arranged parallel with the side of the wagon-body, and the other end thereof is connected, by means of a rod 59, with the forked scale-beam 60. This beam is preferably fulcrumed upon a bracket 61, secured to the side of the wagon-body, and is held in position thereon by straps 62. Adjustable weights 63 are mounted upon the graduated portions of the beam, and a hanger 64 is also provided for holding weights. These straps 62 have set-screws 65 therein, by means of which the beam 60 may be held against movement when not in use. The operation of this modified form is substantially similar to that of the form hereinbefore described. When the wagon-body presses downward on the ends of the yokes 47 and 49, the inner end of the yoke 49 will be pressed upward against the bearing-plate 50 in bracket 51, and the lever 52 will therefore be forced upward, so as to draw the free end of the longitudinally-extending lever 57 therewith. This lever will press the rod 59 upward, and as the beam 60 is connected to said rod it is obvious that the beam will be moved in unison with the levers. When the scales are not in use and it is desired to relieve the various beams thereof of the weight of the wagon-body, it is merely necessary to remove the pin 55 in any suitable manner from the ears 54.

In Figs. 11 and 12 I have shown modified forms of standards which may be employed in lieu of the pivoted standard 5, hereinbefore referred to. The standard 66 (illustrated in Fig. 13) has a stem 67, which projects through the bolster on which it is mounted and has a nut 68 thereon, whereby the standard can be securely held in proper position. When it is desired to move the standard away from the wagon-body, so as to prevent frictional contact between it and the body, it is merely necessary to release the stem, so as to permit the standard to be rotated. The standard 69 (shown in Fig. 14) has a stem 70 mounted in a slot 71, formed within the bolster. A toothed or serrated plate 72 is secured upon the bolster and is normally engaged by teeth 73, formed upon the lower end of the standard. The nut 74 upon the stem 70 serves to hold the teeth 73 in engagement with plate 72. When, however, it is desired to remove the standards from contact with the wagon-body, the stem 70 is released and the standard 69 partly raised, so as to disengage the teeth, and said standard can then be moved laterally a desired distance and refastened by adjusting the nut upon the stem.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with a wagon-body and a scale-beam pivotally connected thereto; of yokes connected to the said body and having bearings at points intermediate their ends, extensions adjustably connected to the yokes, and means connecting said extensions with the scale-beam.

2. The combination with a wagon-body; of a scale-beam connected thereto, oppositely-extending yokes connected at their ends to the wagon-body, arms to the yokes, extensions connected to the arms, means for holding the extensions at angles to the arms, and mechanism for connecting the extensions to the scale-beam.

3. The combination with a wagon-body; of a scale-beam connected thereto, depending sockets upon the wagon-body, links within the sockets, yokes pivotally connected to the links, arms to the yokes, extensions adjustably connected to the yokes, means for connecting the extensions with the scale-beam, and bearing-plates for the yokes at points between their ends.

4. The combination with bolsters having bearing-plates thereon; of a wagon-body, a scale-beam connected to the wagon-body, oppositely-extending yokes connected at their ends to said wagon-body and mounted at points between their ends upon the bearing-plates, arms extending from the yokes, extensions connected thereto, arms to the extensions for holding them out of alinement with the arms of the yokes, and links connecting the scale-beam and extensions.

5. The combination with bolsters having bearing-plates thereon, an intermediate strip upon each bolster, and retaining-plates upon said strip; of a wagon-body, yokes connected at their ends thereto and mounted upon the bearing-plates and under the retaining-plates, arms to the yokes, extensions pivoted to the arms, means for holding the arms and extensions out of alinement, a scale-beam connected to the wagon-body, laterally-extending pins thereon, and links connecting the pins and extensions.

6. The combination with bolsters having bearing-plates thereon, and hinged standards upon the bolsters; of a wagon-body between the standards, sockets depending from said body, links secured within the sockets, yokes projecting into the sockets and engaging the links, said yokes being mounted upon the bearing-plates, inwardly-extending arms to the yoke, hooked extensions pivoted to the arms, arms to the extensions for holding said extensions and the arms of the yokes out of alinement, a scale-beam connected to the wagon-body, and links connecting said beam with the hooked extensions.

7. The combination with bolsters having bearing-plates thereon, and standards upon the bolsters; of a wagon-body between the standards, means for clamping the body upon said standards, yokes pivotally connected at their ends to the body and mounted upon the bearing-plates, arms to the yokes, hooked extensions pivoted to the arms, means for holding the extensions out of alinement with the arms, a depending bracket upon the wagon-body, a scale-beam fulcrumed therein, laterally-extending pins upon the beam, and links connecting said pins with the extensions.

In testimony whereof I affix my signature in presence of two witnesses.

CHARLES SKIDMORE.

Witnesses:
   HERBERT D. LAWSON,
   CHAS. S. HYER.